United States Patent [19]

Snyder

[11] 4,220,134
[45] Sep. 2, 1980

[54] TOASTER/OVEN ACCESSORY CONTAINER

[75] Inventor: Paul V. Snyder, Whitehall, Pa.

[73] Assignee: General Electric Company, New York, N.Y.

[21] Appl. No.: 11,329

[22] Filed: Feb. 12, 1979

[51] Int. Cl.$^3$ .............................................. A47J 27/00
[52] U.S. Cl. .................................... 126/390; 220/4 B; 220/82 R; 99/428; 126/200; 126/373
[58] Field of Search ........................ 126/373, 390, 200; 99/428, 347; 220/4 R, 4 B, 4 E, 82 R

[56] References Cited

U.S. PATENT DOCUMENTS

| | | | |
|---|---|---|---|
| 2,722,173 | 11/1955 | Cunningham | 126/390 |
| 3,593,702 | 7/1971 | Zigomalas | 126/390 |
| 3,780,642 | 12/1973 | Bay | 220/4 B |
| 3,809,063 | 5/1974 | Hajnal | 126/373 |
| 4,143,647 | 3/1979 | Husslein et al. | 126/390 |

Primary Examiner—George T. Hall
Attorney, Agent, or Firm—Leonard J. Platt; George R. Powers; John F. Cullen

[57] ABSTRACT

An accessory cooking container for toaster/ovens comprises a pan and a cover, the pan having a generally rectangular flat bottom surrounded by upstanding sidewalls and a peripheral flange extending outwardly from the tops of the sidewalls. A lip bounds the perimeter of the peripheral flange. In one embodiment, the cover comprises a flat top surrounded by downwardly extending sidewalls and a peripheral flange extending outwardly from the bottom edges of the sidewalls. The flange is sized to be accommodated within the lip of the bottom, wherein the cover is restrained from sliding off the bottom. The flange of the pan defines a slot through which the flange of the cover may be gripped to remove the cover. The cover is optionally provided with a heat-resistant glass window having high transmissivity to infrared energy mounted in an opening in the top thereof. In another embodiment, the entire cover is fabricated of glass having high transmissivity to infrared energy, whereby infrared energy impedes on food in the pan and on the interior surfaces of the pan to speed cooking of the food. The cooking container (except for the glass) is fabricated of aluminum coated on both its interior and exterior surfaces by black Teflon. Thus, the cooking container absorbs heat rapidly. In particular, when used in a toaster/oven having both top and bottom heating elements, balanced cooking between the top and bottom surfaces of the food item within the container is achieved.

21 Claims, 4 Drawing Figures

TOASTER/OVEN ACCESSORY CONTAINER

BACKGROUND OF THE INVENTION

This invention relates to a cooking container for eggs or other small food items which is particularly useful as an accessory of toaster/ovens.

Toaster/ovens are useful counter appliances having wide consumer acceptance. Toaster/ovens generally comprise a housing having a cooking chamber defined therein, with horizontal racks mounted in the cooking chamber for supporting dry food items, such as bread, or for supporting containers for liquid food items. Toaster/ovens have upper and lower electrical heating elements, i.e. there are heating elements both above and below the food item being cooked, and the toaster/ovens are, therefore, capable of performing toasting, broiling and browning operations.

Toaster/ovens are particularly useful in cooking small food items, because the use of a large stove oven to cook or warm a small food item is inefficient. For instance, toaster/ovens are particularly useful for toasting bread or bulkier bread items, including English muffins. Toaster/ovens are particularly useful in preparing breakfast, when the number of food items to prepare, such as the number of slices of toast, is uncertain and when several people may eat at staggered times.

It would be more convenient and efficient if toaster/ovens could be utilized more fully, particularly in the preparation of breakfast food items, such as eggs, French toast, and the like. To date, no specialized accessories have been provided to enable toaster/ovens to achieve such operations, and the use of ordinary cooking containers, such as a frying pan, for cooking an egg in a toaster/oven is not a satisfactory solution.

SUMMARY OF THE INVENTION

It is a principal object of the invention herein to provide an accessory cooking container for cooking eggs or the like in toaster/ovens.

It is an additional object of the invention herein to provide an accessory cooking container for toaster/ovens which minimizes cooking time.

It is a further object of the invention herein to provide an accessory cooking container for toaster/ovens which is easy to clean.

It is another object of the invention herein to provide an accessory cooking container for toaster/ovens wherein the cooking container permits visual monitoring of the cooking result.

It is a still further object of the invention herein to provide an accessory cooking container for toaster/ovens wherein the cooking container includes an easily removed cover.

The cooking container according to the invention herein comprises a bottom pan having a flat bottom surface, upstanding sidewalls joined with the flat bottom surface by rounded transitional portions and also joined with each other by rounded transitional portions to provide a substantially smooth surface. A flat peripheral flange extends outwardly from top edges of the sidewalls, and an upstanding lip is provided bounding the outer perimeter of the peripheral flange. The bottom pan is preferably fabricated of aluminum, and both the inside and outside surfaces of the bottom pan have a dark release coating applied thereto, which is preferably black Teflon. The bottom pan is sized to receive a slice of bread, an egg, other small food items or small quantities of food.

In one embodiment, the cooking container further comprises a cover having a top surface and sidewalls downwardly extending therefrom, with rounded corner portions between the top surface and the sidewalls as well as between the adjacent sidewalls. Thus, a smooth interior and exterior surface of the cover is provided. A peripheral flange extends outwardly from the sidewalls, and the flange rests on the flange of the bottom pan in parallel facing relationship and inside the lip thereof, so that the cover is restrained from sliding off the bottom pan. The cover is removable by grasping its flange, which is exposed through a slot in the peripheral flange and associated upstanding lip of the bottom pan. The cover is also preferably aluminum and coated on both the inside and outside surfaces with black Teflon. The cover is optionally provided with a heat-resistant glass window, preferably having high transmissivity of infrared energy, mounted covering an opening in the top surface.

The black Teflon release coating on the exterior surfaces of the bottom pan and cover provide for good heat absorption from the outside of the cooking container, wherein food items therein cook quickly. As an example, an egg can be cooked in the toaster/oven accessory cooking container in about the same time as required for toasting a heavy bread item, such as an English muffin. Thus, the cooking container achieves simultaneous cooking of typical breakfast food items. Radiant heat is received by a food item in the cooking container through the optional glass window of the cover, which also permits visual monitoring of the cooking result.

In another embodiment, a cover is fabricated of glass of a type having high transmissivity of infrared energy, such as glass having a high quartz content. The cover may be flat and be received on the flat peripheral flange of the bottom pan within the upstanding lip, the cover further comprising a handle for removing it from the bottom pan. Cooking speed is enhanced by radiant heat which is transmitted through the cover and absorbed by both the food and by the exposed portions of the dark heat absorptive coating on the interior of the bottom pan. A good balance between top and bottom cooking is also achieved.

The bottom pan alone is useful in cooking items, such as French toast, wherein the cooking of the bottom of the French toast through the bottom surface of the pan and the cooking of the top of the toast by radiant heat from the upper heating elements of the toaster/oven is well balanced. Of course, the cooking container is easily cleaned, having the dark release coating on both the interior and exterior surfaces thereof.

Other and more specific objects and features of the invention herein will in part be obvious and will in part appear from a perusal of the following description of the preferred embodiments and claims, taken together with the drawings.

DRAWINGS

The same reference numerals refer to the same elements throughout the various Figures.

DESCRIPTION OF PREFERRED EMBODIMENTS

Figure 1:
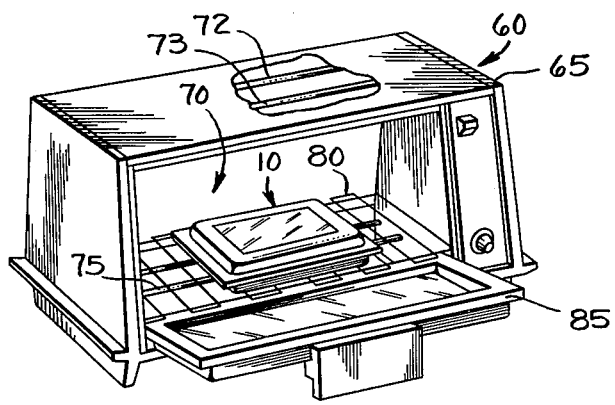
FIG. 1 is a perspective view of a toaster/oven containing a toaster/oven accessory cooking container according to the invention.
Figure 2:
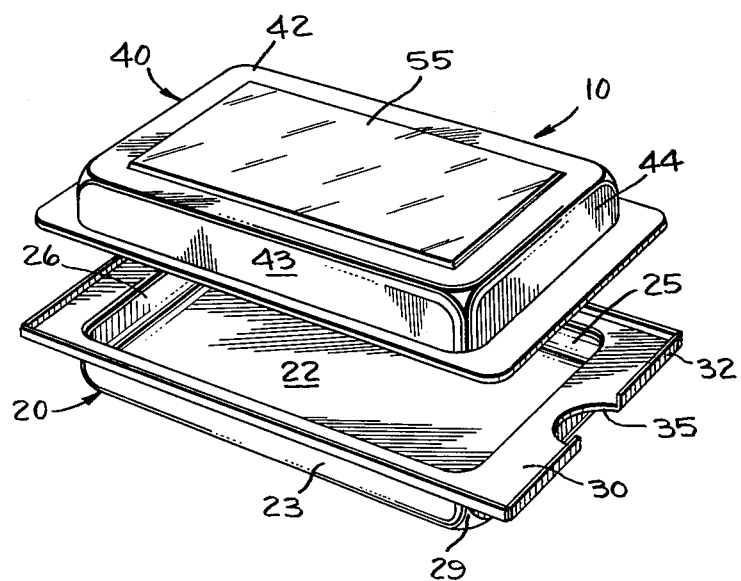
FIG. 2 is an exploded perspective view of the toaster/oven accessory cooking container of FIG. 1.
Figure 3:
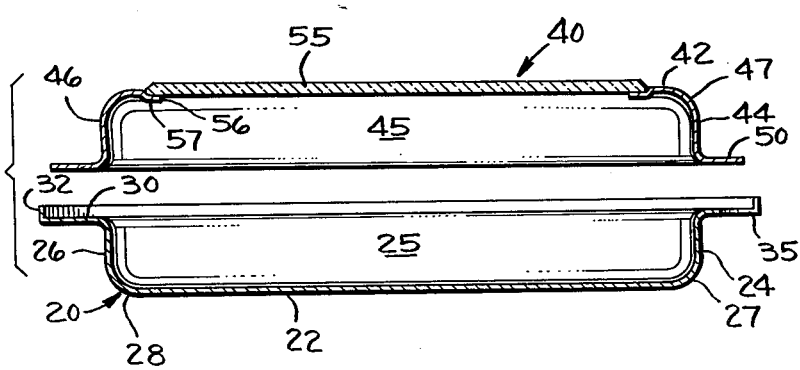
FIG. 3 is a sectional view of the toaster/oven accessory cooking container of FIG. 1 taken along the lines 3—3 of FIG. 2.

In FIG. 1, a toaster/oven accessory cooking container 10 is shown being used in conjunction with a toaster/oven 60, and the details of the construction of the cooking container 10 are illustrated in FIGS. 2 and 3.

The cooking container 10 comprises a pan 20 having a substantially flat, generally rectangular bottom 22 and upstanding sidewalls 23-26. As best seen in FIG. 3, the joining of the bottom and the sidewalls 23-26 is achieved by rounded transition portions, such as the rounded portion 27 between the bottom 22 and sidewall 24 and the rounded transition portion 28 between the bottom 22 and the sidewall 25. The adjacent sidewalls also preferably are joined by rounded transition portions, such as the rounded portion 29 joining sidewalls 23 and 24. Thus, the inside surface of the pan 20 is substantially smooth and does not have corners which can accumulate food and be difficult to clean. The pan 20 further comprises a peripheral flange 30 extending outwardly from the tops of and surrounding the sidewalls 23-26 and which is substantially parallel to the bottom 22. The flange 30 is bounded about its perimeter by an upstanding lip 32. A slot 35, which may be generally semicircular and be sized to accommodate a finger or thumb, is defined through the flange 30 and lip 32 adjacent the sidewall 24.

The pan 20 is preferably fabricated of aluminum wherein it has low mass and good heat conduction. The pan 20 is preferably entirely coated, i.e. on both its inside and outside surfaces, with a dark release coating, and black Teflon (a trademark for polytetrafluorinatedethylene) is preferably employed for this purpose. The pan 20 is preferably about three-quarters of an inch deep and has inside dimensions of about four inches between the sidewalls 23 and 25 and about six inches between the sidewalls 24 and 26.

The cooking container 10 further comprises a cover 40 having a top 42 and sidewalls 43-46 which extend downwardly from the top 40. The transitions between the top and its sidewalls are preferably curved, and in FIG. 3 a rounded transition portion 47 is illustrated between the top 42 and the sidewall 44. The cover 40 further comprises a peripheral flange 50, which extends outwardly from the bottom edges of the sidewalls 43-46. The peripheral flange 50 is sized to have overall dimensions slightly smaller than the peripheral flange 30 of the pan 20, wherein the flange 50 may be accommodated within the lip 32 of the flange 30. Thus, when the cover 40 is placed upon the pan 20, the flange 30 of the pan and the flange 50 of the cover lie adjacent each other in parallel facing relationship which provides a reasonable although not airtight seal between the cover and the pan, and the lip 32 prevents the cover from sliding off the pan. The cover 40 is conveniently removed from the pan 20 by grasping the cover flange 50 at the slot 35, where both sides of the cover flange 50 may be gripped.

The cover 40 optionally and preferably further comprises a heat-resistant glass window 55. The heat-resistant glass window 55 is mounted to the top 42 of the cover 40, and in particular, the top 42 defines a rectangular opening 56 surrounded by an offset flange 57. The peripheral edges of the window 55 rest on the offset flange 57, and may be secured thereto by a suitable adhesive. The glass for the glass window 55 preferably exhibits high transmissivity of infrared energy. For instance, the glass may have a high quartz content or otherwise be formulated to have similar or higher infrared transmissivity.

The cover 40, with the exception of the heat-resistant glass window 55, is preferably fabricated of aluminum, and coated by black Teflon on both the inside and outside surfaces thereof. The cooking container is handled by grasping the peripheral flange 30, and the lip 32 bounding the peripheral flange 30 engages either a finger or a hot pad in a nonslip manner.

The cooking container 10 is advantageously used as an accessory in a toaster/oven 60. The toaster/oven 60 generally comprises a housing 65 defining a cooking chamber 70 therein. The cooking chamber is provided with upper heating elements 72 and 73 and one or more lower heating elements 75. One or more racks, such as rack 80, are mounted in the cooking chamber 70, and the cooking container 10 is supported on the rack 80, as illustrated in FIG. 1. The toaster/oven 60 further comprises a door 85 for closing the cooking chamber 70, and knobs, such as knobs 90 and 91, for controlling operation of the heating elements. An important feature of the toaster/oven 60 as it relates to the cooking container 10 of the invention herein is that the toaster/oven 60 provides heat from both above and below the cooking container 10.

The cooking container 10 according to the invention herein achieves relatively rapid cooking rates by virtue of its low mass and dark coating on the outside surface thereof, the dark coating absorbing heat quickly and the heat being quickly conducted to the interior of the cooking container and the food therein. With the optional and preferable glass window 55, radiant heat is also passed to the food, as well as to the exposed interior surfaces, where it is absorbed by the dark coating. The cooking container 10 also provides balanced cooking on the top and bottom of food items therein. Of course, it is easy to clean by virtue of the release coating on both its interior and exterior surfaces.

By way of example, the cooking container 10 is particularly well adapted to cook an egg. A raw egg placed in the pan 20 spreads across the bottom 22 into an acceptable serving size. The cover 40 is placed on the pan 20, and the cooking container 10 is placed in the toaster/oven 60. An additional food item, such as an English muffin, can also be placed on the rack 80 of the toaster/oven 60 adjacent the cooking container 10. The door is closed and the heating elements are actuated. Heat is rapidly absorbed by the pan 20 to cook the egg and particularly the bottom of the egg and cooking the top of the egg is enhanced by radiant heat transmitted through the glass window 55. The egg can be cooked to a desirable degree of doneness in approximately the same time as it takes to toast an English muffin.

By way of further example, the pan 20 alone may be used to cook such food items as French toast. A piece of bread coated with the seasoned milk-based liquid is placed in the pan 20, the pan 20 is placed on the rack 80, the door is closed, and the heating elements are turned on. The pan 20 absorbs heat rapidly, cooking the bottom surface of the French toast contained therein. Radiant and ambient heat cooks the top surface of the French toast at approximately the same rate, wherein balanced cooking between the top and bottom surfaces is achieved and the need for turning the French toast is obviated.

Figure 4:
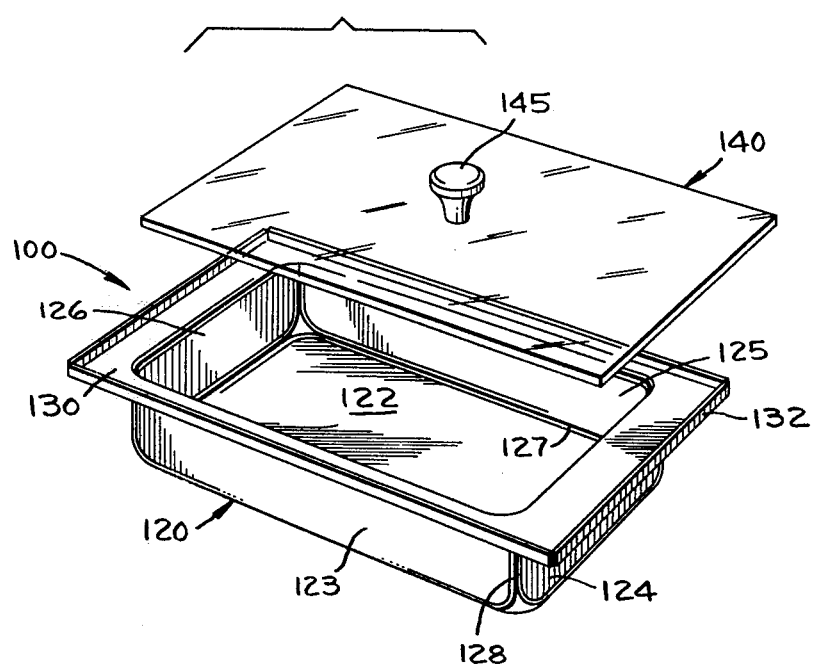
FIG. 4 is an exploded perspective view of another toaster/oven accessory cooking container according to the invention herein.

FIG. 4 illustrates a cooking container 100 which is a second embodiment according to the invention herein. The cooking container 100 generally comprises a pan 120 and a cover 140. A primary difference between the cooking container 100 of FIG. 4 and the cooking container 10 of FIGS. 1-3 described above is that the cover 140 of the cooking container 100 is fabricated of glass of the type having a high transmissivity to infrared energy.

The pan 120 has a substantially flat generally rectangular bottom 122 and upstanding sidewalls 123–126. The bottom 122 and the sidewalls 123–126 are preferably joined by rounded transition portions, such as the rounded transition portion 127 between the bottom 122 and the sidewall 125. The adjacent sidewalls are also preferably joined by rounded transition portions, such as the rounded transition portion 128 joining the adjacent sidewalls 123 and 124. Thus, the inside surface of the pan 120 is substantially smooth.

The pan 120 further comprises a peripheral flange 130 extending outwardly from the tops of and surrounding the sidewalls 123–126, the peripheral flange 130 being substantially parallel to the bottom 122. The peripheral flange 130 is bounded about its perimeter by an upstanding lip 132.

The pan 120 is preferably fabricated of aluminum wherein it has low mass and good heat conduction. It is preferably entirely coated, i.e. on both its inside and outside surfaces, with a dark release coating, such as black Teflon. The pan 120 preferably has a depth in the range of approximately three-quarters to one and one-quarter inches and may have inside dimensions of approximately four inches between the sidewalls 123 and 125 and about six inches between the sidewalls 124 and 126.

The cover 140 is fabricated of glass of the quartz type or a glass which has similar high transmissivity of infrared energy. The cover 140 is preferably flat and rectangular, being sized to rest on the flange 130 of the pan 120 within the lip 132. The lip 132 thereby prevents the cover 140 from sliding off the pan 120. A centrally positioned upstanding knob 145 is provided to facilitate placing and removing the cover 140 with respect to the pan 120. The knob 145 may be glass formed integrally with the cover 140, or may be a separate piece suitably secured thereto. It will be appreciated that the cover 140 may have other configurations, if desired, although the flat configuration is believed superior for transmitting infrared energy.

The cooking container 100 is also advantageously used as an accessory in the toaster/oven 60, achieving relatively rapid cooking rates. The dark coating on the outside surface of the pan 120 absorbs heat quickly and the heat is rapidly conducted to the food in the pan 120. The cover 140 passes infrared energy to the interior of the cooking container 100 where it is absorbed by and cooks the food contained therein, and is also absorbed by the dark release coating on the interior surface which is not covered by the food therein. This enhances the rate at which food items are cooked, and the cooking container 100 achieves a good balance between cooking of the top and the bottom of food contained therein.

Accordingly, the cooking container 10 described above admirably achieves the objects of the invention herein. It will be appreciated that changes can be made from the preferred embodiment described above without departing from the spirit and scope of the invention, which is limited only by the following claims.

I claim:

1. A cooking container for use as an accessory with toaster/ovens for cooking small food items such as eggs, the cooking container comprising:
   (A) a pan having a bottom and sidewalls upstanding therefrom and a peripheral flange extending outwardly from the top edges of the sidewalls, the inside and outside surfaces of the pan being coated with a dark colored heat-absorptive release coating; and
   (B) a cover having a top, sidewalls extending downwardly therefrom and a peripheral flange extending outwardly from the bottom edges of the sidewalls, the inside and outside surfaces of the cover being coated with a dark colored heat-absorptive release coating, the cover being sized to cover the pan with the peripheral flange of the pan and the peripheral flange of the cover in parallel facing engagement, and means for retaining the cover from sliding off the pan;
   whereby the dark release coating on the exterior surfaces of the pan and cover causes the pan and cover to absorb heat quickly, and promotes rapid cooking of food items within the cooking container.

2. A cooking container as defined in claim 1 wherein the pan and cover are fabricated of aluminum and the dark colored heat-absorptive release coating is black polytetrafluorinatedethylene.

3. A cooking container as defined in claim 1 wherein said bottom pan further comprises an upstanding lip bounding the peripheral edge of the flange and the flange of the cover is sized to be received within the lip, wherein the cover is restrained from sliding off the pan.

4. A cooking container as defined in claim 3 wherein a slot is defined in the flange and peripheral lip of the pan and the flange of the cover is exposed in the slot, whereby the cover may be removed from the pan by grasping its flange at the slot.

5. A cooking container as defined in claim 1 wherein there are rounded transitions between the bottom and sidewalls of the pan, the adjacent sidewalls of the pan, the top and sidewalls of the cover and the adjacent sidewalls of the cover.

6. A cooking container as defined in claim 1 wherein the cover further comprises a heat-resistant glass window mounted in an opening in the top thereof.

7. A cooking container as defined in claim 6 wherein the heat-resistant glass has transmissivity of infrared energy equal to or greater than a quartz type glass.

8. A cooking container as defined in claim 1 wherein the pan is generally rectangular and the dimension between one pair of opposed sidewalls is approximately four inches, the dimension between the other pair of opposed sidewalls is approximately six inches and the depth of the pan is approximately three-quarters of an inch.

9. A cooking container as defined in claim 4 wherein there are rounded transitions between the bottom and sidewalls of the pan, the adjacent sidewalls of the pan, the top and sidewalls of the cover and the adjacent sidewalls of the cover.

10. A cooking container as defined in claim 9 wherein the cover further comprises a heat-resistant glass window mounted in an opening in the top thereof.

11. A cooking container as defined in claim 10 wherein the pan is generally rectangular and the dimension between one pair of opposed sidewalls is approximately four inches, the dimension between the other pair of opposed sidewalls is approximately six inches and the depth of the pan is approximately three-quarters of an inch.

12. A cooking container as defined in claim 11 wherein the pan and cover are fabricated of aluminum and the dark colored heat-absorptive release coating is black polytetrafluorinatedethylene.

13. A cooking container for use as an accessory with toaster/ovens for cooking small food items, such as eggs, the cooking container comprising:
  (A) a pan having a bottom and sidewalls upstanding therefrom, the inside and outside surfaces of the pan being coated with a dark colored, heat-absorptive release coating; and
  (B) a cover adapted to be received and retained on the pan, the cover being fabricated of glass having transmissivity of infrared energy approximately equal to or greater than a quartz type glass,
whereby the dark release coating on the exterior surface of the pan causes the pan to absorb heat quickly and the cover passes infrared energy to the interior of the cooking container where it is absorbed by food items therein and by the dark release coating on the inside surfaces of the pan not covered by the food item therein, all promoting rapid cooking of food items within the cooking container.

14. A cooking container as defined in claim 13 wherein the pan further comprises a peripheral flange extending outwardly from the top edges of the sidewalls and an upstanding lip bounding the peripheral edge of the flange, the cover being sized to rest on the flange within the lip, whereby the cover is restrained from sliding off the pan.

15. A cooking container as defined in claim 14 wherein the cover further comprises a knob facilitating the placing and removing of the cover with respect to the pan.

16. A cooking container as defined in claim 14 wherein the cover is substantially flat.

17. A cooking container as defined in claim 16 wherein the cover further comprises a knob facilitating the placing and removing of the cover with respect to the pan.

18. A cooking container as defined in claim 17 wherein the knob is integral with and centrally positioned on the cover.

19. A cooking container as defined in claim 18 wherein the pan is fabricated of aluminum and the dark colored heat-absorptive release coating is black polytetrafluorinatedethylene.

20. A cooking container as defined in claim 19 wherein the pan is generally rectangular and the dimension between one pair of opposing sidewalls is approximately four inches, the dimension between the other pair of opposed sidewalls is approximately six inches and the depth of the pan is in the range of approximately three-quarters to one and one-quarter inches.

21. A cooking container as defined in claim 20 wherein there are rounded transitions between the bottom and sidewalls of the pan and the adjacent sidewalls of the pan, wherein the pan has a smooth inside surface which is easily cleaned.

* * * * *